US008875034B2

(12) United States Patent
Roulliere et al.

(10) Patent No.: US 8,875,034 B2
(45) Date of Patent: Oct. 28, 2014

(54) METHOD OF IMAGE PROCESSING WITH DYNAMIC ANONYMIZATION

(75) Inventors: Stéphane Roulliere, Rennes (FR); Olivier Fabre, Rennes (FR)

(73) Assignee: Orange, Paris (FR)

( * ) Notice: Subject to any disclaimer, the term of this patent is extended or adjusted under 35 U.S.C. 154(b) by 475 days.

(21) Appl. No.: 13/069,583

(22) Filed: Mar. 23, 2011

(65) Prior Publication Data
US 2011/0246895 A1 Oct. 6, 2011

(30) Foreign Application Priority Data

Mar. 31, 2010 (FR) ..................................... 10 52422

(51) Int. Cl.
- G06F 13/00 (2006.01)
- G06F 15/00 (2006.01)
- G06Q 10/10 (2012.01)
- G06K 9/00 (2006.01)

(52) U.S. Cl.
CPC ............ G06Q 10/10 (2013.01); G06K 9/00677 (2013.01)
USPC .......................................... 715/763; 715/765

(58) Field of Classification Search
CPC ............................ G06Q 10/00; G06Q 9/00677
USPC ......... 715/700, 715, 763–765, 851, 740, 753, 715/739, 745, 741
See application file for complete search history.

(56) References Cited

U.S. PATENT DOCUMENTS

| | | | |
|---|---|---|---|
| 2010/0199166 A1* | 8/2010 | Fisk, III | 715/230 |
| 2010/0287053 A1* | 11/2010 | Ganong et al. | 705/14.66 |
| 2011/0292231 A1* | 12/2011 | Winters | 348/222.1 |
| 2011/0307491 A1* | 12/2011 | Fisk | 707/741 |
| 2012/0045093 A1* | 2/2012 | Salminen et al. | 382/103 |

OTHER PUBLICATIONS

Garcia et al., "An Anonymous Social Network Site to Share Pictures," Fourth International Conference on Software Engineering Advances, 2009, ICSEA'09, IEEE, Piscataway, NJ, USA, pp. 229-234 (Sep. 20, 2009).

* cited by examiner

Primary Examiner — Kevin Nguyen
(74) Attorney, Agent, or Firm — Drinker Biddle & Reath LLP

(57) ABSTRACT

A method is provided for processing at least one image, comprising a representation of a first user for presentation to a second user, comprising steps for: obtaining an indication representative, either of an absence of relationship between the first and the second user, or of a relationship existing between the first and the second user; and modifying said image before presentation to the second user, in such a way that the first user is not identifiable by the second user, said modifying step being intended to be executed if it is determined, in accordance with at least one anonymization rule defined in relation to said cue, that said image need undergo such a modification.

9 Claims, 1 Drawing Sheet

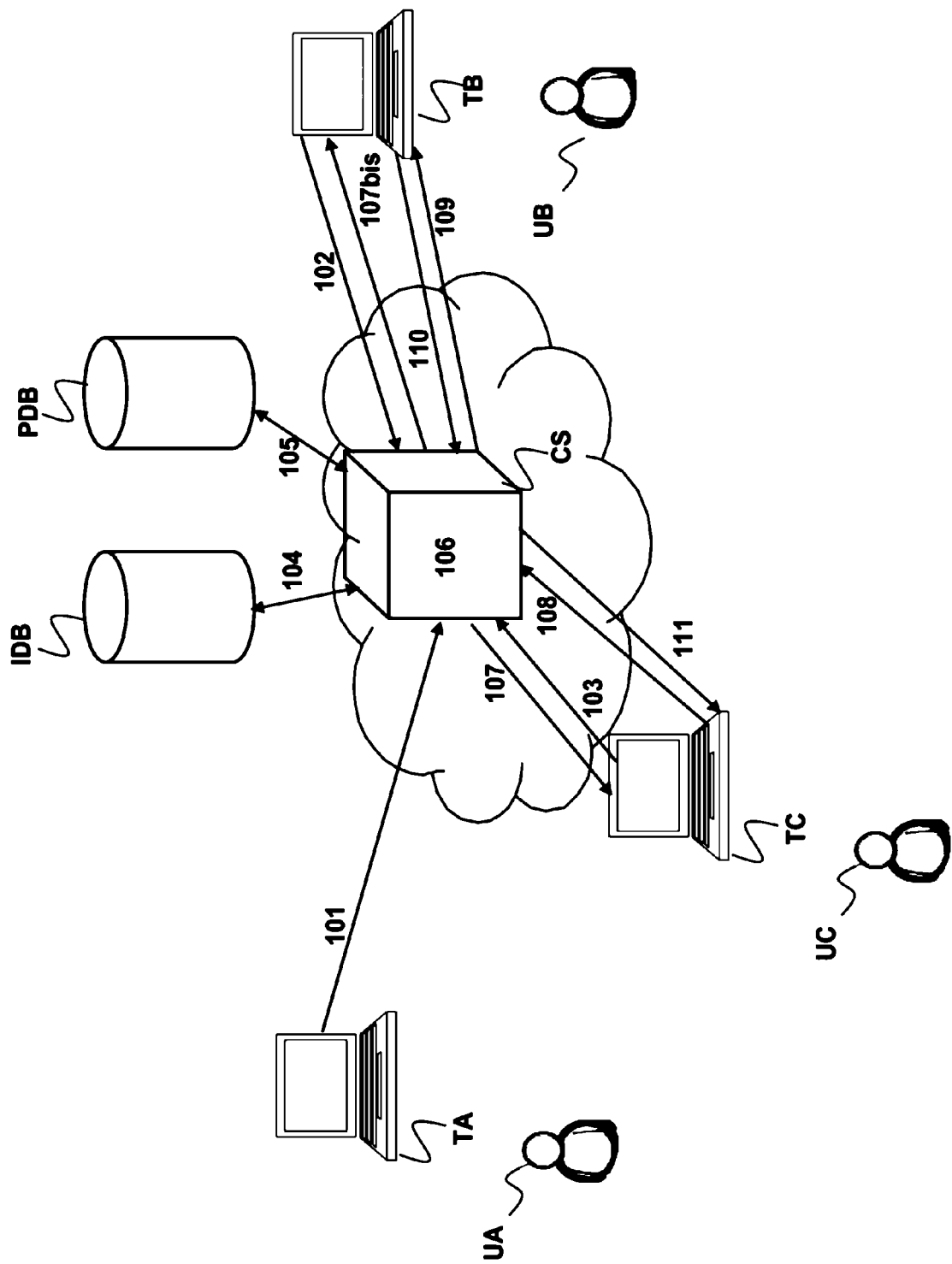

METHOD OF IMAGE PROCESSING WITH DYNAMIC ANONYMIZATION

CROSS-REFERENCE TO RELATED PATENT APPLICATION

This application claims the benefit of French Patent Application No. 10 52422, filed on Mar. 31, 2010, in the French Institute of Industrial Property, the entire contents of which is incorporated herein by reference.

BACKGROUND

The invention relates to the field of digital contents and more precisely to an image processing method and corresponding device.

The invention finds an application in the field of telecommunication networks and the Internet, and more particularly, in the field of on-line services affording functionalities for sharing on-line digital contents, for example within a social network.

In particular, the objective of social networks is to allow the members of a community to interact with one another on the one hand, and to share contents on the other hand. Content sharing is performed by making a multimedia document accessible to a several members of the community.

During content sharing by a member, the list of members entitled to have access to this content is drawn up by the owner of the content. Multimedia content thus shared is therefore either entirely visible to a member other than the owner, or invisible, depending on whether or not they feature in the list of entitled members. No other tools exist for managing the visibility of shared content within a social network.

The inventors have thus noted the need to have available a procedure for more finely managing the way of sharing contents.

Within the context of the social network, and in the particular case of the sharing of a photo or of a video where physical persons appear, the exposure of all these physical persons can in fact be controlled only by the owner by authorizing access to the entire content himself.

This principle is today problematic since it implies that a photo can circulate within a group of members without taking account of the desire to be made visible of the persons appearing on the photo.

A user therefore has no technical way of supervising or of measuring the exposure of his image in the social network. Furthermore, this system does not foster compliance with the right of image in force in France in particular.

In this context, the aim of the invention is to afford a user of a social network the possibility of supervising the dissemination of his image within this social network.

SUMMARY

One of the aims of the invention is to remedy problems, drawbacks or inadequacies of the prior art and/or to make provide solutions not previously considered.

According to a first embodiment of the invention, a method is provided for processing at least one image, comprising a representation of a first user and intended to be presented to a second user, comprising:

a step of obtaining an indication representative, either of an absence of relationship between the first and the second user, or of a relationship existing between the first and the second user;

a step to determine, in accordance with at least one anonymization rule defined in relation to said cue, whether said image need undergo, before presentation to the second user, a modification by applying an image processing function rendering the first user non-identifiable by the second user;

a step of modifying at least one zone of said image containing said representation by applying a so-called image processing function.

The anonymization rules whose parameters can be set according to the relationship (or absence of relationship) existing between two users make it possible to take into account, during the sharing of contents, the modes of interaction between the users of the network within which this sharing of contents is implemented. It is thus possible to control the anonymization of the images as a function of the users to which these images are presented. A user can thus remain anonymous on digital photos which are disseminated to all the network member users, except on those which are presented to his friends, or to a chosen group of people.

In the implementation, any relationship existing, implicitly or explicitly, between two users may be considered. Indeed, in a social network, a relationship is not necessarily explicit (declared or qualified by a user who would declare another user as forming part for example of his group of friends), but can also be implicit: be neither declared, nor qualified explicitly by a user, but resulting for example implicitly from parameter settings performed by a user, defining groups of users with which he interacts or communicates in a different manner. In this second case, with each group of users is associated an implicit relationship between the users of this group, said relationship being defined as "belonging to the membership" of this group of users.

Various embodiments discussed herein offer a novel functionality making it possible to guarantee in a social network the protection of a fundamental right: the right of image. It is applicable to any existing service for sharing contents.

According to a first embodiment of the method according to the invention, said relationship is a relationship within a social network of which the first and the second user form part. In this way, this relationship (or absence of relationship) being information that is known within the social network, this information is directly utilizable so as on the one hand, to define anonymization rules and on the other hand, to proceed in an automated manner with the modifications of images required as a function of the rules based on this information.

According to another embodiment of the method according to the invention, a so-called anonymization rule is defined by the first user. Each first user thus controls the dissemination of the images which comprise a representation of this user.

According to another embodiment, the method according to the invention furthermore comprises a step of dispatching a notification to the first user to inform him of the presentation of said image to said second user. A complementary process is thus made available to the first user to control the dissemination of the images which comprise a representation of this user.

The various embodiments mentioned hereinabove are mutually combinable for the implementation of the invention.

According to a second embodiment, a device is provided for processing at least one image, comprising a representation of a first user and intended to be presented to a second user, comprising:

elements for obtaining an indication representative either of an absence of relationship between the first and the second user, or of a relationship existing between the first and the second user;

elements to determine, in accordance with at least one anonymization rule defined in relation to said cue, whether said image need undergo, before presentation to the second user, a modification by applying an image processing function rendering the first user non-identifiable by the second user;

elements for modifying at least one zone of said image containing said representation by applying a so-called image processing function.

The advantages stated in respect of the method according to various embodiments of the invention are transposable directly to the device.

More generally, the device according to the invention comprises elements for implementing the steps of the method.

According to a preferred implementation, the various steps of the method are implemented by software organized into software modules or a computer program comprising algorithms. This software comprises software instructions that are executed by a data processor of an image processing device and designed to control the execution of the various steps of this method.

Consequently, an embodiment of the invention is also aimed at a program that is able to be executed by a computer or by a data processor, this program comprising instructions for controlling the execution of the steps of a method such as mentioned hereinabove.

This program can use any programming language, and be in the form of source code, object code, or of code intermediate between source code and object code, such as in a partially compiled form, or in any other desirable form.

The invention is also aimed at an information medium readable by a data processor, and comprising instructions of a program such as mentioned hereinabove.

The information medium may be any entity or device capable of storing the program. For example, the medium can comprise a storage means, such as a ROM, for example a CD ROM or a microelectronic circuit ROM, or else a magnetic recording medium, for example a diskette (floppy disk) or a hard disk.

Moreover, the information medium may be a transmissible medium such as an electrical or optical signal, which may be conveyed via an electrical or optical cable, by radio or by other means. The program may be downloaded from an Internet network.

Alternatively, the information medium may be an integrated circuit into which the program is incorporated, the circuit being adapted to execute or to be used in the execution of the method in question.

According to one embodiment, the invention is implemented by means of software and/or hardware components. In this regard, the term "module" may correspond in this document equally well to a software component, as to a hardware component or to a set of hardware and software components.

A software component corresponds to one or more computer programs, one or more subroutines of a program, or more generally to any element of a program or of a piece of software able to implement a function or a set of functions, according to what is described hereinbelow in respect of the module concerned. Such a software component is executed by a data processor of a physical entity (terminal, server, gateway, set-top-box, router, etc.) and is able to access the hardware resources of this physical entity (memories, recording media, communication bus, input/output electronic cards, user interfaces, etc.).

In the same manner, a hardware component corresponds to any element of a hardware set able to implement a function or a set of functions, according to what is described hereinbelow in respect of the module concerned. It may involve a programmable hardware component or one with integrated processor for executing software, for example an integrated circuit, a chip card, a memory card, an electronic card for executing firmware, etc.

BRIEF DESCRIPTION OF THE DRAWINGS

Other aims, characteristics and advantages of the invention will become apparent through the description which follows, given solely by way of nonlimiting example and with reference to the appended drawings in which the FIGURE represents in a schematic manner a communication system integrating a device according to an embodiment of the invention and the exchanges between the entities of this system.

DETAILED DESCRIPTION

Various embodiments of the invention are described in detail in the context of its application to an on-line service for sharing digital contents in the form of a social network. These apply more generally to any image sharing system in which it is possible to determine a relationship existing between two users of this system: for example a company network or a home network whose users belong to predefined groups, representative of their reciprocal relationships.

The system represented in the FIGURE comprises:
a server CS, in the form of a Web server, implementing the on-line contents sharing service and managing access to a social network via which this service is accessible;
a first database, for storing digital videos and images and for managing the rights of access to these videos or images; this first database is referenced IDB and subsequently dubbed "images database";
a second database, for storing and managing users' profiles, referenced PDB and subsequently dubbed "profiles database",
terminals TA, TB and TC belonging to users UA, UB and UC respectively, and provided with a communication software application and with a communication hardware interface for establishing a connection through the Internet network with the server CS.

The server CS is able to interrogate the profiles database PDB to record therein a profile in association with an identification of a user or to extract the data of such a profile.

The server CS is able to interrogate the images database IDB to deposit therein or extract therefrom content (image or video). Each content item is recorded therein in association with an identification of a user and of the access rights defined for this content. Thus a user, who accesses the content sharing service and establishes a communication with the server CS, can seek to deposit content that he desires to share and define the rights of access to this content.

The images database IDB is furthermore designed to store in association with an image or a video, identifications of the persons who might be represented in this image or video, as well as an indication of the image zone and/or of the video part in which this person is represented. The server CS is able to interrogate the images database IDB to store or conversely obtain such identifications or indications.

These identifications of persons are either determined automatically by the server CS, or received from the user who supplies the image or the video to be stored.

The server CS comprises for this purpose an image analysis module, appropriate for implementing a "facial recognition" algorithm. This image analysis module makes it possible to identify a person represented in a digital video or a photo. Such an algorithm can comprise comparing the characteristics extracted from the face of the person represented with a set of faces stored in database. Such algorithms are known in the prior art and will not be described in greater detail. Some of them furthermore comprise indexation and face search functionalities. Thus, once the images have been analyzed, it becomes possible to search through a set of images for those in which a person in particular is represented.

The server CS thus uses its image analysis module to obtain an identification of the persons who are represented in the images stored in the images database IDB: these identifications are thereafter stored in association with the image or the video concerned and with an indication of the image zone and/or of the video part in which this person is represented.

As a supplement or as a variant, instead of implementing facial recognition, there may be provision for the user who supplies an image for storage to transmit to the server an identification (name or alias of the person in the social network) of the persons who are in this photo. In this variant, there is provided a user interface in a Web page which allows a user to crop a zone of the image where the person for whom an identification is provided is located or a face recognition module which automatically crops the faces, the user now merely having to indicate the name (or identifier and password) of the people concerned. The indication thus supplied by the user can furthermore serve for simply defining the image zone to be processed.

The server CS furthermore comprises an image processing module, able to modify an image or a sequence of images, in such a way that a person represented in this or these images is not identifiable: the image processing function applied is therefore a function rendering the first user non-identifiable by the second user. This modification is typically effected by masking all or part of the face—or indeed also all or part of the body—of the person represented. Such a masking operation is known from the prior art and comprises for example in:

applying a blurring function to the face of the person represented, or masking a part at least of the face of the person, superimposing thereon an opaque rectangle (black band, usually) or any other opaque or semi-opaque form, rendering this face non-identifiable.

When processing a video, the various images of the video in which the person to be masked is represented will be processed by the image processing module.

This image processing module therefore makes it possible to implement image anonymization.

Generally, the social network is constituted so that a user, a member of this network, has the possibility of forming a "group of friends" with which the principles of interaction and sharing will be common for the set of members belonging to the group.

Each user of the social network is provided in particular with a way for defining the various types of relationships that he maintains with the various users of the social network, that is to say the various groups of users for which this user has a given type of relationship. The data defining these various types of relationships are recorded for example in this user's profile, such as stored in the profiles database PDB.

For this purpose, a profile of a user—for example user UB—comprises a list of the other users of the social network who have a relationship, via the social network, with this user UB. This list optionally comprises several sub-lists, each defining a group of users and a type of relationship associated with this group of users, for example:

a sub-list comprising the members of the family of this user UB and therefore defining which users have a relationship with the user UB in the form of a member of the family of the user UB;

a sub-list comprising the close friends of this user UB and defining a relationship of "close friends" type and therefore defining which users have a relationship with the user UB in the form of a close friend of the user UB;

a sub-list comprising the users not belonging to the other two sub-lists and comprising the other people having a relationship, via the social network, with this user UB.

In this example, the users of the social network not belonging to any of these sub-lists are considered not to be known to the user UB: in this situation, it is considered that there is absence of relationship between this user UB and any one of these users. According to the same principle, for any user who is not a member of the social network, it is considered that there is absence of relationship between this user and a user who is a member of the social network.

Each user of the social network is also provided with way for defining anonymization rules: these rules are defined for a user UB, in relation to an indication representative:

either of an absence of relationship between this user UB and another user of the social network, or of a relationship existing, implicitly or explicitly, within the social network between this user UB and another user of the social network.

An anonymization rule determines whether there need or whether there need not be anonymization of a user U1 represented on an image, when this image is intended to be presented to another user U2 of the social network, that is to say, if this image needs, before presentation to this other user, to be modified in such a way that the first user U1 is not identifiable by the second user U2. It is taken into account in this determination, the relationship existing between U1 and U2 (or absence of relationship), that this relationship is explicit (declared or qualified by U1) or implicit (neither declared, nor qualified explicitly by U1, but resulting for example implicitly from parameter settings performed by U1, defining groups of users with whom he interacts in a different manner for each group).

Preferably, an anonymization rule furthermore defines the image processing function to be applied for the anonymization: blurring, masking, etc. In the absence of such a definition, a default function is applied automatically.

According to a first variant, the anonymization rules are recorded in the form of a table, comprising a list of type of relationships and, for each type of relationship, an indication indicating whether or not there needs to be anonymization. For example:

TABLE 1

| Anonymization Rules | |
|---|---|
| Type of relationship | Anonymization |
| Relationship of "family" type | NO |
| Relationship of "close friend" type | NO |
| Other type of relationship | YES |
| Absence of relationship | YES |

According to a second variant, the anonymization rules are recorded in the form of a table, comprising a list of groups of users and, for each group, an indication indicating whether or not there needs to be anonymization. In this second variant, each user group represents, implicitly at least, a particular relationship. In this sense, the relationship existing between two users ensues implicitly from parameter settings performed by one of these users, when he defines a group of users with which he interacts in a particular manner, different a priori from the manner in which he interacts with users of another group.

The data describing the anonymization rules defined by a user are recorded, for example, in this user's profile, which is stored in the profiles database PDB.

These anonymization rules will be applicable to all the images, disseminated through the social network and comprising a representation of this user: whether this be a representation of his face and/or of all or part of his body, from the moment this representation makes it possible to identify this user.

In a particular embodiment, the modification applied to the image will thus be adapted to the nature of the relationship between the user represented in the image and the one to whom this image is intended to be presented: this modification will be all the more significant (for example, masking of the whole face and of the whole body) the better the two users are acquainted/the closer they are in the social network. It may be more succinct, for example if the two users do not have any link in the social network (black band over the eyes only). The purpose is each time that the person represented is not recognized by the person to whom the image is presented. According to a variant embodiment, the user has the possibility of defining a rule for selecting the image modifications function to be applied in the case that anonymization is required. According to another variant embodiment, the choice of this image modification function also is predefined automatically/recorded by default with the definition of the anonymization rule.

The server CS is designed to apply these anonymization rules, that is to say, to determine whether anonymization is required and to apply, when anonymization is required, the image processing function defined by this rule.

The FIGURE represents the various exchanges taking place between the entities of the system represented in this same FIGURE.

During step 101, the user UA uses his terminal TA to establish a connection with the server CS, and then to transfer digital images, in the form of digital photos, to the server CS to share them with other members of the social network. During this connection, the user UA specifies which users of the social network are authorized to access these photos: a user in particular, a user group (his friends, for example) or all the social network member users. It is assumed by way of example that user UA authorizes at least user UC to access these photos and that the user UB is represented on one of these photos.

On receipt of the photos to be shared, the server CS obtains an identification of the persons represented on each photo, either as result of an image analysis performed by the image analysis module of the server CS, or on the basis of an indication communicated by the user UA. These identifications are stored in memory in association with each photo in the images database IDB, as well as with an indication of the image zone and/or of the video part in which this person is represented.

As an option, the server CS transmits a notification to the user TB via the terminal TB, to inform him that a photo provided by the user UA has been made accessible by the user UA via the social network.

In step 102, the user UB, wishing to protect his privacy, uses his terminal TB to establish a connection with the server CS and to define anonymization rules, which will be applicable to all the images disseminated through the social network and comprising his representation. The user UB specifies, by way of these anonymization rules, the groups of users for which an anonymization is required, as well as the nature of the processing to be applied: masking, blurring, or other.

It is assumed by way of example that the user UB requires an anonymization for the images intended to be presented to a user who is not a friend of the user UB. By way of example, it is assumed here that user UA is a friend of user UB, but that user UC does not form part of the group of the friends of user UB.

Steps 101 and 102 execute independently of one another, in any order and may each be repeated several times before the following steps 103 to 110 are executed.

In step 103, executed subsequent to steps 101 and 102, the user UC uses his terminal TC to establish a connection with the server CS and to view digital photos shared with other members of the social network. These photos may be:
  photos which he owns,
  photos for which a right of access has been granted to him by a member, or
  public photos, that is to say, ones accessible to all the members of the social network.

During this step 103, a request for access to these photos, originating from the terminal TC, reaches the server CS. On receipt of this request, the server CS verifies that the user UC is indeed a member of the social network before executing the following step 104.

In step 104, the server CS interrogates the images database IDB to obtain the set of requested photos.

During step 104, the server CS interrogates the images database IDB to obtain an identification of the persons represented in each requested photo. This identification is either the result of an image analysis performed by the image analysis module of the server CS, or deduced from an indication communicated by the user who supplied this photo.

During step 104, the server CS obtains, also by interrogating the images database IDB, an indication of the image zone in which the identified persons are represented. As is clearly apparent to the person skilled in the art, such an indication defines the image zone to be processed. It is obtained for example in the form of a definition of the contour of the outline of the image zone in question (coordinates of points belonging to this outline) or by a definition of a rectangle, circle or other geometric shape incorporating this zone (for example, coordinates of the vertices of the rectangle in the image).

In step 105, the server CS interrogates the profile database PDB to obtain the anonymization rules defined by the users represented in each photo. The server CS also obtains an indication representative of the relationship (or absence of relationship) the person or persons represented on the photos obtained in step 104 and the user UC requesting these images: this cue is obtained for example by consulting the profile of the persons represented on the photos. These profiles in fact define the nature of this relationship (if it exists) between each of these persons represented (the user UB, in particular) and the user UC or else the group, defined by each of these persons, of which the user UC forms part.

In step 106, the server CS modifies these photos by applying to each representation of a user in a photo the image processing function that may possibly be required by the anonymization rules defined by the users represented in each photo, taking into account the indication representative of the relationship—or absence of relationship—obtained in step 105.

For this purpose, the server CS uses the indication, obtained in step 104, of the image zone in which this person is represented, to determine the part of the photo to which the requested modification needs to be applied.

The photos which have been supplied by the user UC himself are however not modified during step 106.

In the exemplary case chosen, a photo, supplied by user UA, representing user UB and intended to be transmitted to user UC, will undergo a modification so that user UB is not identifiable by user UC, because of the anonymization rule defined by user UB who requests an anonymization for the photos transmitted to a user who is not a friend of user UB.

In step 107 the server CS transmits the requested and modified photos to the user. Thus, the user UC receiving the photos will be unable to recognize the user UC on the photos he receives. As an option, the server CS transmits a notification to the user TB via the terminal TB, to inform him that a photo supplied by the user UA has been transmitted to the user UC after anonymization.

According to another embodiment, there is provision for a function requesting deletion of an anonymization to be available, for example, from the Web page comprising a photo supplied to a user who is a member of the social network.

In this embodiment, subsequent to step 107, the user UC clicks on an element of the user interface of the Web page to trigger this function. An anonymization deletion request 108 is then transmitted by the terminal TC to the server CS.

The server CS then sends a request seeking authorization to the user TB via the terminal TB: this request seeking authorization comprises the unmodified photo, an identification of the user UC requesting the deletion of anonymization, and an identification of the user UA who supplied the photo.

If the user UB authorizes the deletion of anonymization (for example, after exchange with the user UA who supplied the photo), the photo without anonymization—at least as it regards the user UB—is then transmitted during step 110 to the user UC via the terminal TC.

Steps 108 to 110 are repeated for each user represented in the photo and for which the user UC requests anonymization.

To summarize, a first embodiment of the invention relates to a method of processing at least one image, comprising a representation of a first user and intended to be presented to a second user, comprising:
 a step of obtaining an indication representative, either of an absence of relationship between the first and the second user, or of a relationship existing between the first and the second user; and
 a step of modifying said image before presentation to the second user, in such a way that the first user is not identifiable by the second user,
said modifying step being intended to be executed if it is determined, in accordance with at least one anonymization rule defined in relation to said cue, that said image need undergo such a modification.

The invention relates, according to a second aspect, to a device for processing at least one image, comprising a representation of a first user and intended to be presented to a second user, comprising:
 elements for obtaining an indication representative, either of an absence of relationship between the first and the second user, or of a relationship existing between the first and the second user;
 elements for determining, in accordance with at least one anonymization rule defined in relation to said cue, whether said image need undergo, before presentation to the second user, a modification by applying an image processing function rendering the first user non-identifiable by the second user;
 elements for modifying at least one zone of said image containing said representation by applying a so-called image processing function.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Conventional software programming tools including compilers, linkers, or script/batch languages and the like, may be utilized for the programming. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

The invention claimed is:

1. A method of processing at least one image, comprising a representation of a first user for presentation to a second user, comprising steps of:
   obtaining an indication representative either of an absence of relationship between the first and the second user or of a relationship existing between the first and the second user;
   determining, in accordance with at least one anonymization rule defined in relation to said indication, whether said image need undergo, before presentation to the second user, a modification to render the first user non-identifiable by the second user; and
   modifying at least one zone of said image containing said representation by applying an image processing function to modify the image to render the first user non-identifiable by the second user.

2. The method as claimed in claim 1, further comprising a step of obtaining a definition of said image zone.

3. The method as claimed in claim 1, wherein said relationship is a relationship within a social network of which the first and the second user form part.

4. The method as claimed in claim 1, wherein an anonymization rule is defined by the first user.

5. The method as claimed in claim 1, further comprising a step of dispatching a notification to the first user to inform him of the presentation of said image to said second user.

6. The method as claimed in claim 1, further comprising a step of obtaining an identification of the first user on the basis of an indication provided by a third user, providing said at least one image.

7. The method as claimed in claim 1, further comprising a step of obtaining an identification of the first user by application of a face recognition scheme to said image.

8. A non-transitory recording medium readable by a data processor on which is recorded a program comprising program code instructions for the execution of the steps of a method as claimed in claim 1.

9. A device for processing at least one image, comprising a representation of a first user and for presentation to a second user, comprising:
   a routine for obtaining an indication representative, either of an absence of relationship between the first and the second user, or of a relationship existing between the first and the second user;
   a routine for determining, in accordance with at least one anonymization rule defined in relation to said indication, whether said image need undergo, before presentation to the second user, a modification to render the first user non-identifiable by the second user; and
   a routine modifying at least one zone of said image containing said representation by applying an image processing function to modify the image to render the first user non-identifiable by the second user.

* * * * *